United States Patent [19]

Goode et al.

[11] Patent Number: 4,742,514

[45] Date of Patent: May 3, 1988

[54] METHOD AND APPARATUS FOR CONTROLLING A TDM COMMUNICATION DEVICE

[75] Inventors: Steven H. Goode, Palatine; Henry L. Kazecki, Des Plaines; James C. Baker, Hanover Park, all of Ill.

[73] Assignee: Motorola, Inc., Schaumburg, Ill.

[21] Appl. No.: 843,961

[22] Filed: Mar. 25, 1986

[51] Int. Cl.$^4$ .............................................. H04J 3/18
[52] U.S. Cl. ..................... 370/109; 370/97; 455/54
[58] Field of Search .................. 370/85, 94, 95, 100, 370/97, 50, 84, 26, 29, 109; 375/3; 379/88, 59, 63; 381/36; 455/53, 54, 17

[56] References Cited

U.S. PATENT DOCUMENTS

| | | | |
|---|---|---|---|
| 2,629,017 | 2/1953 | Dahlbom et al. | 370/100 |
| 3,471,646 | 10/1969 | Magnuski et al. | 179/15 |
| 3,646,441 | 2/1972 | Magnuski | 325/13 |
| 3,851,104 | 11/1974 | Willard et al. | 370/85 |
| 4,037,158 | 7/1977 | Eastmond | 325/22 |
| 4,105,973 | 8/1978 | Arnold et al. | 375/3 |
| 4,107,608 | 8/1978 | Saburi | 375/3 |
| 4,349,918 | 9/1982 | Gordon | 455/20 |
| 4,517,561 | 5/1985 | Burke et al. | 370/100 |
| 4,525,793 | 6/1985 | Stackhouse | 381/36 |
| 4,630,257 | 12/1986 | White | 370/109 |
| 4,675,863 | 6/1987 | Paneth et al. | 370/50 |

FOREIGN PATENT DOCUMENTS

| | | |
|---|---|---|
| 92237 | 4/1983 | European Pat. Off. |
| 3332220 | 2/1985 | Fed. Rep. of Germany |
| 2538642 | 12/1984 | France |
| 99044 | 12/1981 | Japan |
| 1602839 | 7/1977 | United Kingdom |

OTHER PUBLICATIONS

Kinoshita, et al., "Digital Mobile Radio Telephone System Using TD/FDMA Scheme", 23.4.1–23.4-.5-1981 IEEE.

Primary Examiner—Douglas W. Olms
Assistant Examiner—Melvin Marcelo
Attorney, Agent, or Firm—Thomas G. Berry

[57] ABSTRACT

A time division multiplexed (TDM) communication device controller is disclosed, which controls all signalling, synchronization and supervisory functions. In one embodiment, the invention operates to control a remote communication device having a vo-coder and buffering means. The remote communication device is enabled to operate as a dispatch, full duplex or a combination dispatch/full duplex communication device. In another embodiment, a primary station (repeater) is controlled to operate as a single frequency repeater (SFR) or as a multi-frequency TDM repeater.

15 Claims, 9 Drawing Sheets

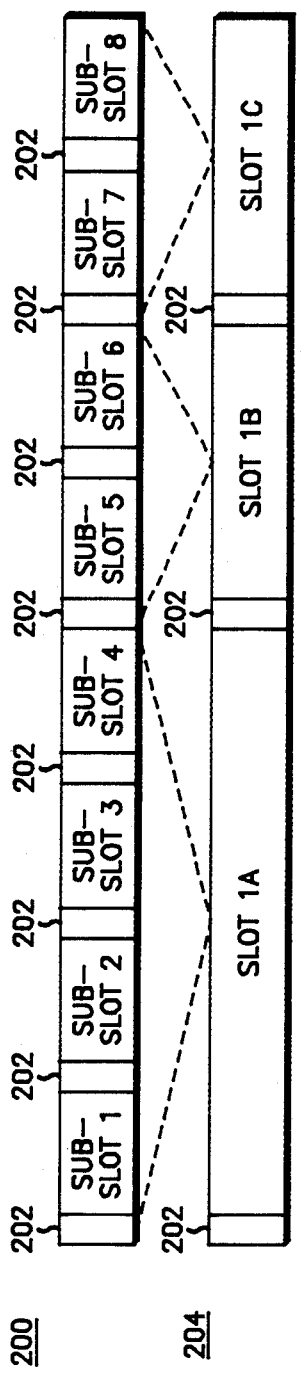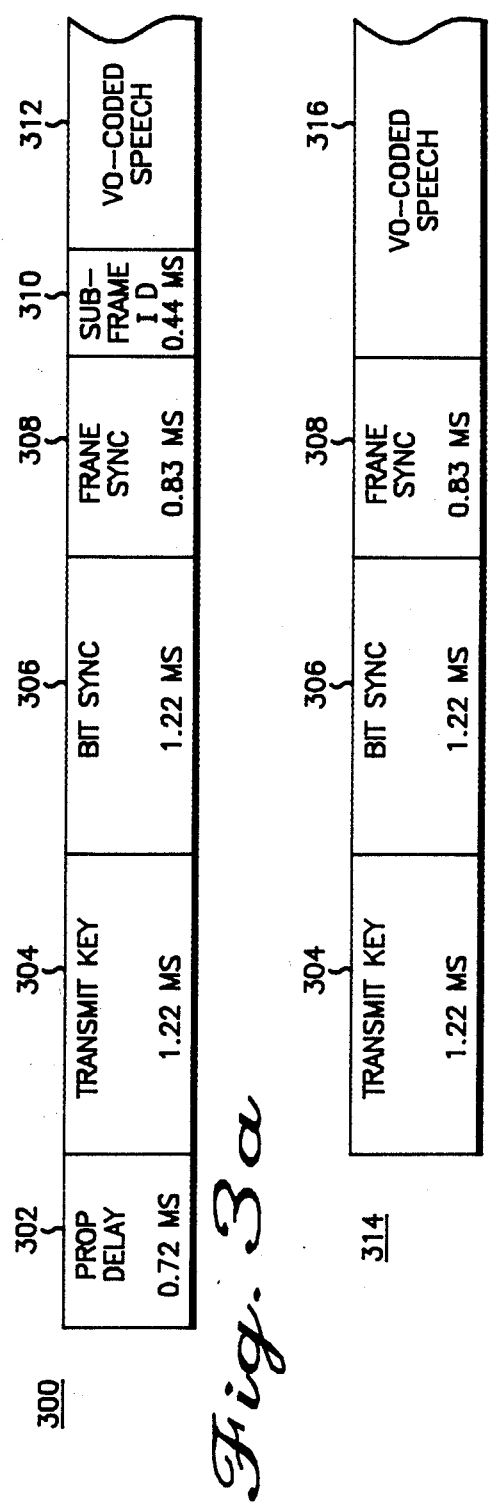
Fig. 2
Fig. 3a
Fig. 3b

METHOD AND APPARATUS FOR CONTROLLING A TDM COMMUNICATION DEVICE

BACKGROUND OF THE INVENTION

This invention relates generally to two-way radio communication and more particularly to time division multiplexed (TDM) digital communication and is more particularly directed to a method and apparatus for controlling a TDM communication device to efficiently utilize the frequency spectrum.

Those skilled in the art will appreciate the congested and crowded nature of the available frequency spectrum. The Federal Communication Commission (FCC) has continually sought ways to reallocate the available spectrum or assign previously reserved spectrum to relieve this congestion. This condition is particularly noticeable in metropolitan areas where a large number of radio users are concentrated in a small geographic area. One proposal the FCC is considering is sharing a portion of the UHF television spectrum with the land mobile market. Another consideration is the reallocation of the land mobile reserve frequencies in the 896-902 MHz region to private land mobile uses.

Another alternative for the FCC is to redefine the standard for land mobile communication channels. Currently, the standard for land mobile communication is a channel having a bandwidth of 25 kHz. However, the FCC may redefine this standard to use 12.5 kHz (or possibly 15 kHz) channels. The theory behind this "band-split" is to effectively double the number of channels in any newly allocated frequency spectrum. Potentially, as "older" spectrum is reallocated, all communications equipment will be required to operate in the 12.5 kHz channel bandwidth.

Although facially attractive, a band-split to double the available number of channels is not without cost. Present day communication devices operate with a sufficient frequency guard-band that protects against adjacent-channel interference (given the frequency stability of the transmitters). Of course, the band-split would also reduce the frequency guard-band tending to lead to higher adjacent-channel interference. Even assuming a greater than a two-to-one improvement in transmitter frequency stability, and high selectivity crystal filters for the receivers, adjacent-channel performance may be degraded by a band-split. Thus, there exists substantial technological barriers that must be overcome to provide a radio with comparable performance specifications at a competitive cost in the marketplace. Therefore, a substantial need exists in the market to develop a communication system that will provide an increase in the number of available communication channels that is compatible with present day 25 kHz channel bandwidths.

SUMMARY OF THE INVENTION

Accordingly, it is an object of the present invention to provide a spectrally efficient communication system.

It is a further object of the present invention to provide a communication system readily adaptable to improved coding techniques.

It is a further object of the present invention to provide a controller for a TDM communication device that operates in a 25 kHz channel bandwidth thereby maximizing spectral efficiency.

Accordingly, these and other objects are achieved in the present time division multiplex communication system.

Briefly, according to the invention, a time division multiplexed (TDM) communication device controller is disclosed, which controls all signalling, synchronization and supervisory functions. In one embodiment, the invention operates to control a remote communication device having a vo-coder and buffering means. The remote communication device is enabled to operate as a dispatch, full duplex or dispatch/full duplex communication device In another embodiment, a primary station (repeater) is controlled to operate as a single frequency repeater (SFR) or as a multi-frequency repeater.

BRIEF DESCRIPTION OF THE DRAWINGS

The features of the present invention which are believed to be novel are set forth with particularity in the appended claims. The invention, together with further objects and advantages thereof, may be understood with reference to the following description, taken in conjunction with the accompanying drawings, and the several figures of which like referenced numerals identify like elements, and in which:

FIG. 2 is an illustration of the preferred organization of a communication channel;

FIG. 3a is an illustration of the preferred organization of the slot overhead for a primary to remote transmission;

FIG. 3b is an illustration of the preferred organization of the slot overhead for a remote to primary transmission;

DETAILED DESCRIPTION OF THE PREFERRED EMBODIMENT

Figure 1:
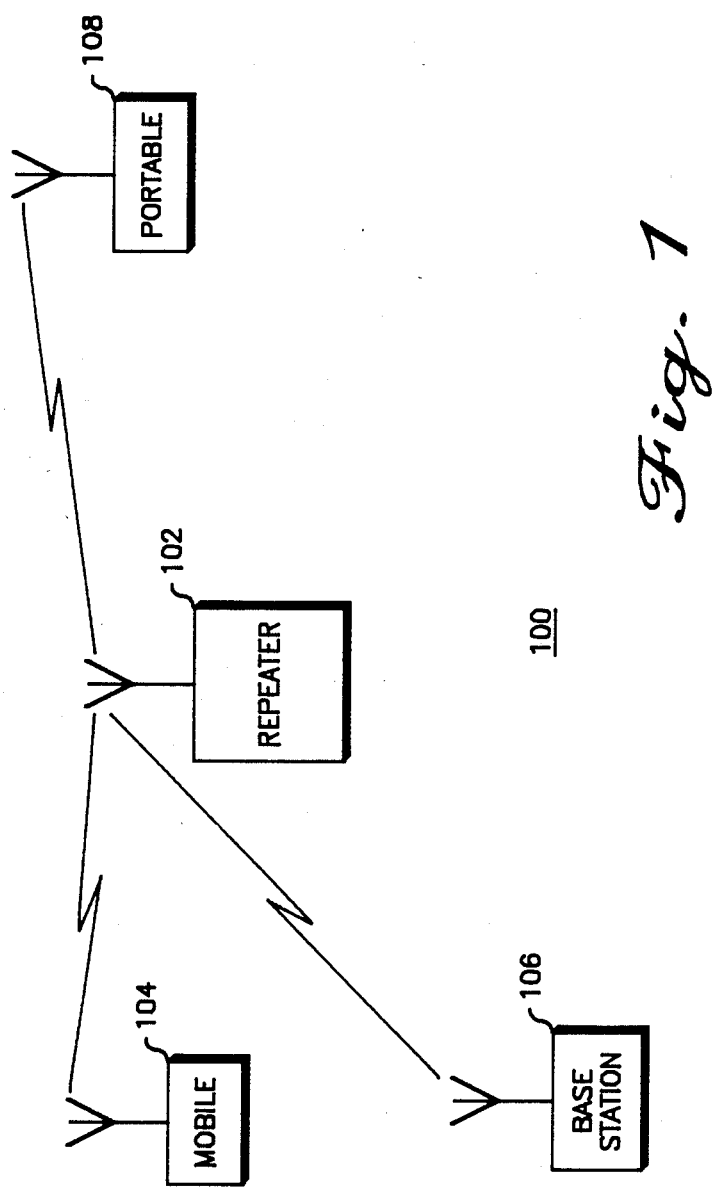
FIG. 1 is a block diagram of a TDM communication system.

In FIG. 1 there is shown a block diagram of a time division multiplexed (TDM) system 100. The system is comprised essentially of a repeater 102, a mobile unit 104, a base station 106 and a portable 108. As used herein, a portable unit (108) is defined to be a communication unit typically designed to be carried about the person. A mobile unit (104) is a transceiving unit designed to be carried in vehicles, and a base station (106) is contemplated to be a permanent or semi-permanent installation at a fixed location. The mobile 104, the base station 106 and the portable unit 108 are hereinafter collectively referred to as remote units, and the repeater 102 is hereinafter referred to as the primary station. The remote units communicate via the primary station using radio frequency (RF) channels that are divided into at least two time slots. The RF channels used by the present invention are contemplated to be standard narrowband land mobile channels. These channels are typically understood to be communication channels having a bandwidth of 25 kHz (for duplex, the channel frequency pairs are spaced 45 MHz apart in the 800 MHz band). Of course, other channel bandwidths and spacings are possible, however, the present invention contemplates the use of standard land mobile channel requirements thereby obviating the need for any new FCC allocations or requirements.

Those skilled in the art can appreciate that human speech contains a large amount of redundant information. To most efficiently utilize the frequency spectrum it is desirable to remove as much of the redundant information as possible prior to transmission. The message is then reconstructed at the receiving end from the transmitted essential speech information. Speech production can be modeled as an excitation signal (i.e., air from the lungs) driving a filter (the vocal tract), which possesses a certain resonant structure. The spoken sound changes with time since the filter varies with time. The excitation is noise-like for unvoiced sounds (i.e., consonants) and appears as a periodic excitation for voiced sounds (for example vowels). Therefore, to reduce the amount of bandwidth required to send a voiced signal, the spectral characteristics of the signal must be analyzed and the nature of the excitation signal must be determined.

Prior communication systems have employed speech digitation techniques such as pulse code modulation (PCM) or continuously variable slope delta (CVSD) modulation to attempt to replicate the time waveforms of the speech signals. However, these techniques suffer the detriment of requiring data rates from 12 kbps to 64 kbps. The current state of the art in land mobile communications is a data rate of 12 kbps to 16 kbps on a 25 kHz channel. This allows the transmission of one voice signal using CVSD. Those skilled in the art will appreciate that the combination of more efficient voice coding (for example coding in the range of 2.4 kbps to 9.6 kbps) and more efficient data transmission (18 kbps to 24 kbps on a 25 kHz channel) would allow the transmission of two or more voice signals in 25 kHz of frequency spectrum.

Prior techinques indicate splitting the communication channels into narrow frequency segments, each being the minimum to allow one digitized voice path. These techniques have two distinct disadvantages. First, narrow channels and wide channels do not mix well within a system so that a gradual transition from wider to narrower channels is accompanied by increased co-channel and adjacent channel interference. Secondly, any particular choice of a narrower standard channel bandwidth "freezes" the state of the art. That is, simply redefining and fixing the standard bandwidth for land mobile communications prohibits advantageous exploitation of technological improvements without another reassignment or redefinition of communication standards.

The present invention keeps the current standard for land mobile communication channels while splitting the time among users according to the fraction of the channel bit rate required for one voice signal. This method has the advantages of preserving the present level of interference protection and allowing splitting (in time) as often as needed to take full advantage of advances in the state of the art of coding and data transmission.

The present invention contemplates vo-coding the voice signal to minimize the speech data rate. As used herein, vo-coding means the analysis and synthesis of voice, which either utilizes a vocal track model, or quantizes sub-bands of a speech waveform to remove redundant speech information thereby enabling the transmission of the required voice information in a reduced bandwidth.

A typical example of a vo-coder employing a vocal track model is a linear predictive coder (LPC). An LPC analyzer typically operates on blocks of digitized voice, determining the model parameters that are applicable during a particular block, and transmitting these parameters to a synthesizer at the receiving unit. The synthesizer reconstructs the speech signal by using the parameters received. Since the model parameters vary slowly with time compared to the speech waveform, the redundancy of the speech is removed.

A typical example of a vo-coder employing speech sub-band quantitization is a sub-band coder (SBC). In an SBC analyzer, sub-bands of a speech waveform are quantized and a determination is made concerning the amount of speech energy in each sub-band. Only those sub-bands having an energy content above a predetermined threshold are transmitted thereby enabling transmission in a reduced bandwidth. Accordingly, vo-coding provides a further reduction in the speech data rate by using a coding technique based upon specific speech characteristics, transmitting only the perceptually important information contained in a speech signal. Vo-coding allows a sufficiently low speech coding rate to enable the division of a 25 kHz channel bandwidth, thereby providing a spectrally efficient communication system.

Referring now to FIG. 2, there is shown an RF communication channel 200 subdivided into 8 time sub-slots. Each time sub-slot 1-8 has associated with it an overhead data portion 202 which contains a signalling protocol to be hereinafter defined. Once the RF channel is divided into a predetermined number of time sub-slots (8 in the preferred embodiment) they are grouped into subsets that form communication time slots employed by the actual system users.

Those skilled in the art will appreciate that vo-coding a voice at various coding rates may affect the perceived quality of the received speech. Accordingly, speech vo-coded in a 9.6 kbps sub-band coder may be of higher perceived quality than 2.4 kbps LPC coded speech. Therefore, the present invention contemplates grouping the 8 time sub-slots into subsets as required by the particular vo-coder utilized An exemplary arrangement of slot assignments is illustrated in FIG. 2 (reference 202). Sub-slots 1-4 have been combined to form slot 1a, which may provide toll quality speech for the users of a system. Slot 1i and slot 1c are formed by combining two sub-slots (5-6 and 7-8 respectively) that may provide speech of a lesser quality that is still acceptable to a particular user. Accordingly, the air-time billing rate may vary depending upon the quality of speech required in a particular user environment. Moreover, as technology improves and the quality of speech for a lower bit rate vo-coder is enhanced, further subdivisions may be readily employed since the system was designed originally to operate with a greater number of time slots (i.e., ultimately the 8 time sub-slots would be communication time slots).

Referring now to FIGS. 3a and 3b, there is shown the preferred embodiment of the overhead data information (202 of FIG. 2) for both the primary-to-remote, and remote-to-primary transmissions. FIG. 3a illustrates the primary-to-remote data overhead 300. The data overhead begins with a propagation delay 302. Typically, the maximum propagation time delay will be defined by the particular system coverage designed into a particular implementation. Typically, system range is predominately responsible for determining the propagation delay. For example, the two-way propagation delay for distant remote units (60 miles) may be twelve bits with 18 kbps signalling. If the vo-coded signal received at the primary station (repeater) were simply repeated, the message delay would become a function of the distance of the transmitting remote unit. The receiving remote units would be required to correctly determine where the message information resided within the slot to correctly recover the voice message. Accordingly, the present invention contemplates a system wherein the primary station repeats the information at a fixed point in the slot. All remote units synchronize to the primary station's transmitted signal.

Following the propagation delay 302 is the transmit key time 304. The transmit key time 304 represents the time required to switch a unit between the transmit and receive frequency. This is typically considered to be a hardware limitation, and in the preferred embodiment is 1.22 milli-seconds (ms) in duration. Those skilled in the art will appreciate that the actual number of bits transmitted will depend on the data rate used. Of course, as improved power amplifiers and frequency synthesizers are designed, the transmit key time may decrease to a lesser duration. The bit synchronization pattern 306 follows the transmit key 304. The bit sync portion of the data overhead 300 represents a digital pattern required to obtain bit synchronization between a transmitting unit and a receiving unit. In the preferred embodiment, the bit sync portion 306 consists of 1.22 ms of an alternating logic-one logic-zero pattern. After acquiring bit synchronization, the receiving unit must also have frame synchronization to properly decode one or more time slots. In the preferred embodiment of the present invention the frame synchronization portion 308 consists of a predetermined digital word. The receiving unit must correctly receive the frame sync portion 308 in a majority decision fashion (3 out of 5 in the preferred embodiment) in order to properly acquire frame synchronization. Synchronizing in this manner allows an acceptable system falsing rate utilizing a minimized number of data bits to form the synchronization word. After frame synchronization, the receiving remote unit receives the subframe ID code 310. The subframe ID code contains information which is used by a remote unit to control and direct the receiving circuitry to operate on at least one TDM slot. Of course, as illustrated in FIG. 2, the receiving remote unit may be informed, via the subframe ID 310, that it will group a plurality of time sub-slots into a single user slot. After correctly synchronizing and decoding an assignment to at least one TDM slot, the remote receives the vo-coded speech 312, which follows the data overhead 300.

In FIG. 3b, the data overhead 314 for the remote-to-primary station transmission is illustrated. The data overhead 314 is similar to the data overhead 300 of FIG. 3a except that the propagation delay 302 is not required since the primary station repeats all messages at the same point in the time slot, and the subframe ID 310 is not required since slot assignment is performed by the primary station (repeater). Following the frame synchronization portion 308 (of the remote-to-primary station data overhead 314) the remote unit transmits the vo-coded voice message.

Figure 4:
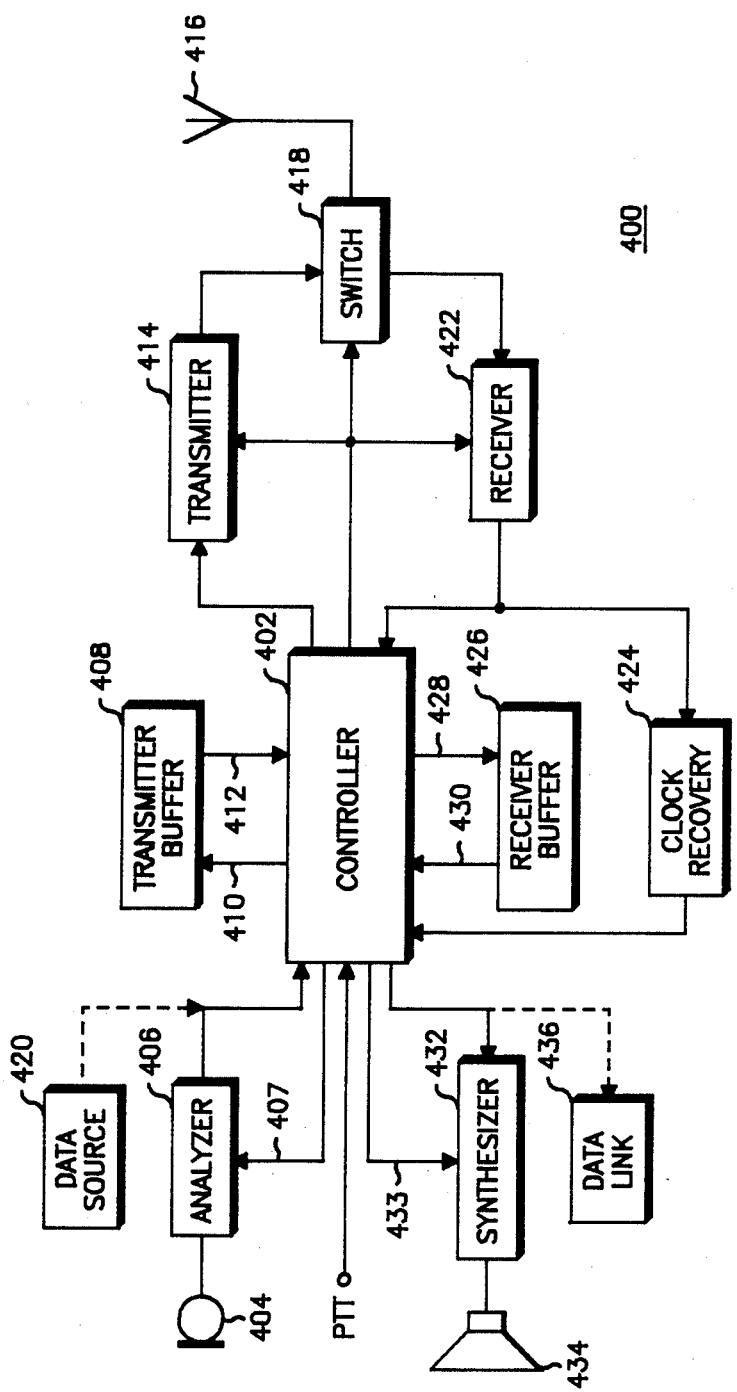
FIG. 4 is a block diagram of a remote unit.

In FIG. 4 there is shown a block diagram of a remote unit 400. The heart of the remote unit 400 is the controller 402 of the present invention (a more detailed illustration and discussion of which follows hereinafter). To transmit, a speech signal is first input via a microphone 404. The speech is analyzed by a vo-coder analyzer 406, which is enabled by the controller 402 via connection 407. The vo-coder analyzer may be any suitable coder and in the preferred embodiment is an LPC or SBC vo-coder. The controller 402 takes the vo-coded information, which is in digital form, and routes it to the transmit buffer 408 via data line 410. The digitized speech information is stored in the transmit buffer 408 at whatever coding rate is selected for the vo-coder analyzer 406. Typical examples of vo-coding data rates include, but are not limited to, 9.6, 4.8, and 2.4 kbps. When the transmit buffer 408 has reached a predetermined capacity limit, the information is extracted by the controller 402 via connection 412 and routed to the transmitter 414. Of course, the controller 402 preambles the speech information by the data overhead portion 202 as illustrated in FIG. 2. The controller 402 couples the transmitter 414 to an antenna 416 via the switch 418. Alternatively, the switch 418 could be replaced with a duplexer (or the like) to continually couple the transmitter and receiver to the antenna. In this manner, the data overhead and speech information are transmitted at a selected transmission data rate, which must be at least twice that of the vo-coding data rate. Alternately, data information (already in digital form) may be transmitted in the same manner via data source 420. Moreover, a combination of vo-coded speech and data may alternatively be sent as determined by a particular user.

To receive information from a time slot, the controller 402 couples the antenna 416 to a receiver 422 via the switch 418. The receiver 422 is coupled both to the controller 402 and a clock recovery means 424, which may be any suitable clock recovery means that will synchronize the controller 402 to the received information using the bit sync or frame sync portions. Once synchronized, the controller 402 takes the received vo-coded speech (or digital data) and routes it to the receive buffer 426 via connection 428. This information is clocked into the receive buffer 426 at a suitable data rate, which typically may be the transmission data rate. The information is extracted from receive buffer 426 via connection 430 and routed through the controller 402 to the vo-coding synthesizer 432. Of course, the information must be extracted at a data rate identical to that which the speech information was vo-coded. The synthesizer 432, enabled by the controller 402 by connection 433, operates on the essential speech components to synthesize the voice signal. This signal is applied to a speaker 434 that allows the message to be received by the operator. If, however, data was transmitted during a TDM slot, the data sink 436, which may be a printer or monitor device, accepts the data and displays it for the operator.

Figure 5:
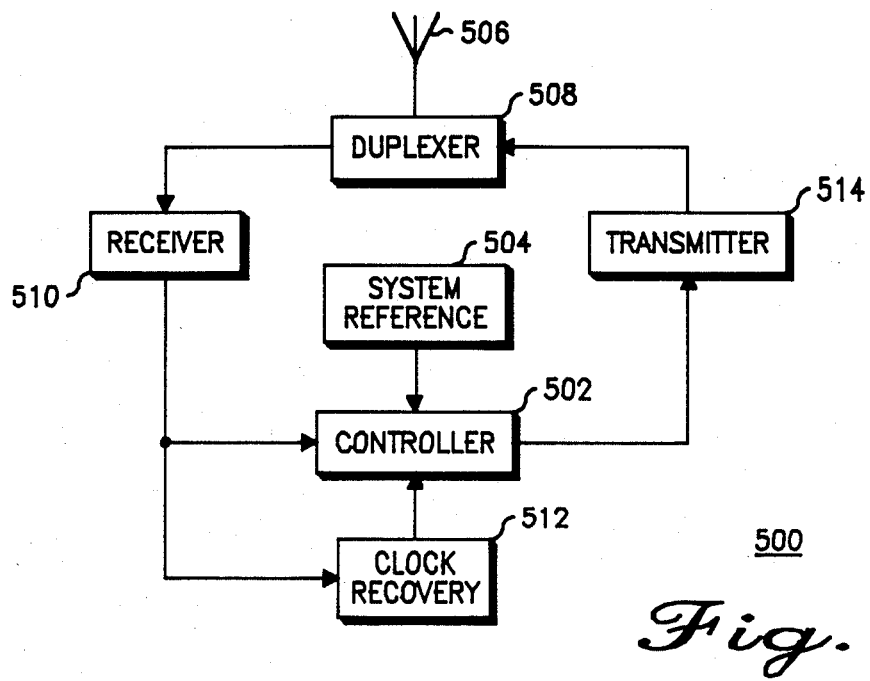
FIG. 5 is a block diagram of a primary unit.

Referring now to FIG. 5, there is shown a block diagram of a repeater 500 that is controlled by the present invention to operate in a TDM communication system. The system reference 504 provides the controller 502 with the clock signal, which is used to determine the transmission data rate. Operationally, a vo-coded signal is received from at least one time slot on a first frequency and travels from the antenna 506 through the duplexer 508 to a receiver 510. The receiver 510 is coupled to a clock recovery device 512 and the controller 502. The controller accepts the received vo-coded data signal from the receiver 510 at the data rate determined by the clock recovery device 512 and supplies it to the transmitter 514. The transmitter 514 repeats the signal including the data overhead 202 in at least one time slot on a second frequency (at a transmission data rate determined by the controller 502) through the duplexer 508 to the antenna 506.

Figure 6:
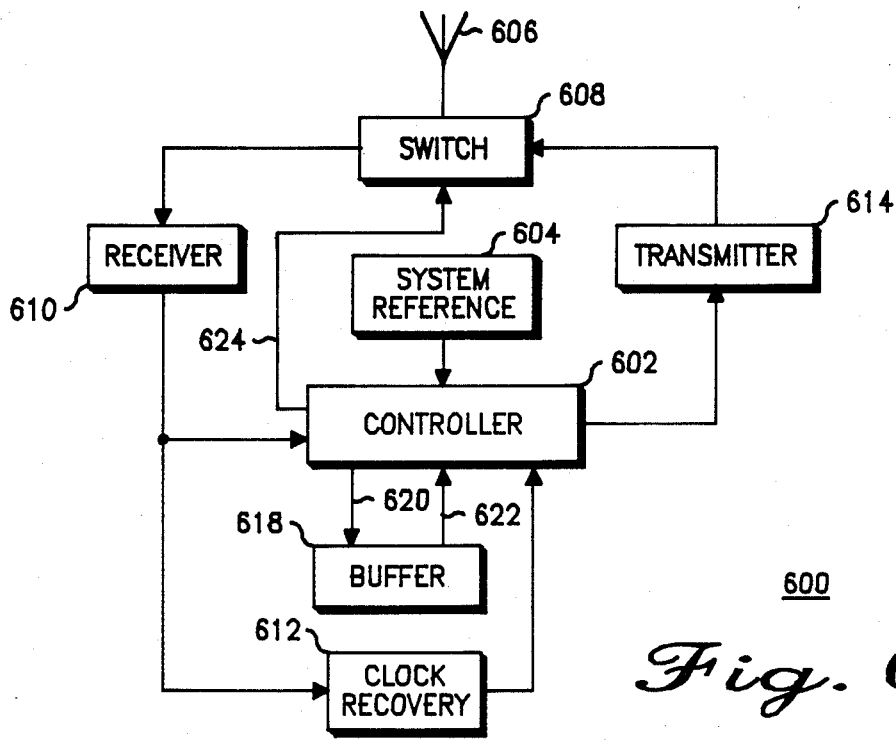
FIG. 6 is a block diagram of a single frequency primary unit.

Referring now to FIG. 6, a block diagram of a single frequency repeater (SFR) controlled by the present invention is shown. The repeater 600 is controlled by the controller 602, which takes a master clock signal from the system reference 604. A signal is received via antenna 606 and routed via the switch 608 to the receiver 610. The receiver 610 supplies signals to the clock recovery means 612 and the controller 602. The received vo-coded signal is stored in a buffer 618 via connection 620 at the received data rate as determined by the clock recovery means 612. The vo-coded message is stored in the buffer 618 until a subsequent time slot, at which time the buffer 618 is emptied by the controller 602 via connection 622 at a predetermined data rate, which is typically the transmission data rate. The controller 602 then routes the buffered signal to the transmitter 614. The transmitter 610 sends the signal to the antenna 606 via the switch 608, which has been coupled to the transmitter via the controller 602 through connection 624. Accordingly, in an SFR, the transmitter 614 and receiver 610 are multiplexed to the antenna 606, therefore a duplexer is not required. Those skilled in the art will appreciate that either the multiple frequency repeater or the single frequency repeater may be used alternately or in combination in any particular TDM system.

Figure 7:
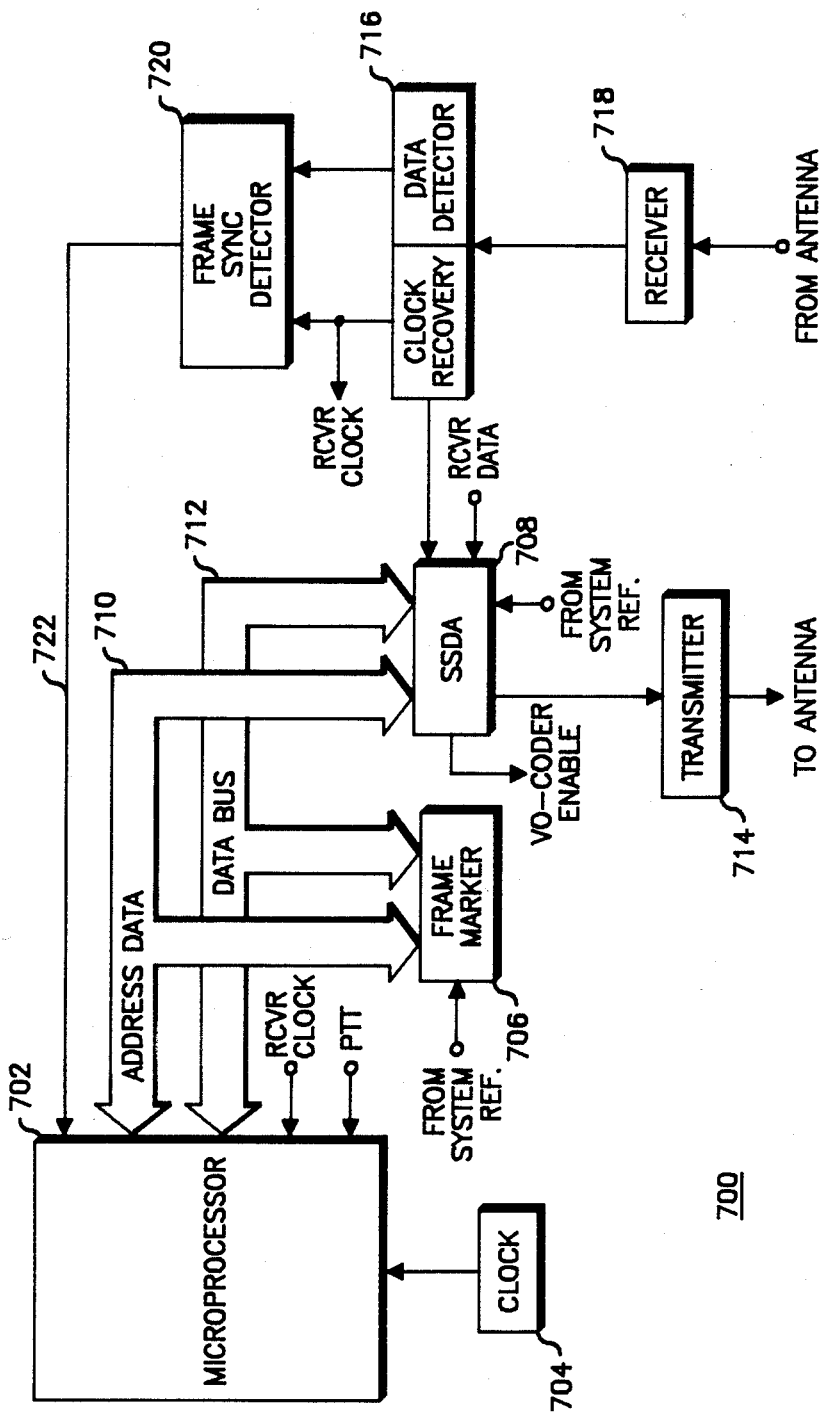
FIG. 7 is a block diagram of the preferred embodiment of the controller of the present invention.

Referring now to FIG. 7 there is shown a block diagram of the present invention (controller 700) suitable for use in either a primary or remote unit. The controller 700 is comprised of a microprocessor 702, such as an MC6801 manufactured by Motorola, Inc. The microprocessor 702 is supplied a clock signal by clock source 704. The system reference (see FIGS. 5 and 6) is routed to the frame marker 706 and the Synchronous Serial Data Adaptor (SSDA) 708. Microprocessor 702 is coupled to the frame marker 706 and the SSDA 708 via an address bus 710 and a data bus 712. The frame marker 706 is used to generate the frame synchronization information contained in the data overhead as was described in conjunction with FIG. 2. The frame marker 706 can be any convenient device and may be, for example, a programmable timer module (PTM), such as an MC6840 manufactured by Motorola, Inc. The SSDA 708 is used in the controller 700 to accept data from the microprocessor 702 and communicate the data serially to the transmitter 714. In the preferred embodiment, the SSDA is an MC6852 manufactured by Motorola, Inc. The SSDA 708 is also coupled to the clock recovery and data detector 716. The clock recovery data detector 716 is coupled to the receiver 718 and is used to supply the received synchronization information and received vo-coded voice signals to the SSDA 708. Thus, the SSDA is used in both the transmit and receive modes to route data accordingly. The clock recovery and data detector 716 is also coupled to the frame sync detector 720. The frame sync detector 720 receives data from the data detector and clock recovery device 716 and is used to look for the frame sync marker in the received vo-coded signal. When frame synchronization is achieved, the frame sync detector 720 alerts the microprocessor 702 via connection 722. Once the clock recovery device and the frame sync detector have both synchronized, the vo-coded signal can be either repeated (as in the primary stations of FIGS. 5 or 6), or received and routed to the vo-coder synthesizer to recover the voice signal (as in the remote unit of FIG. 4).

Figure 8A:
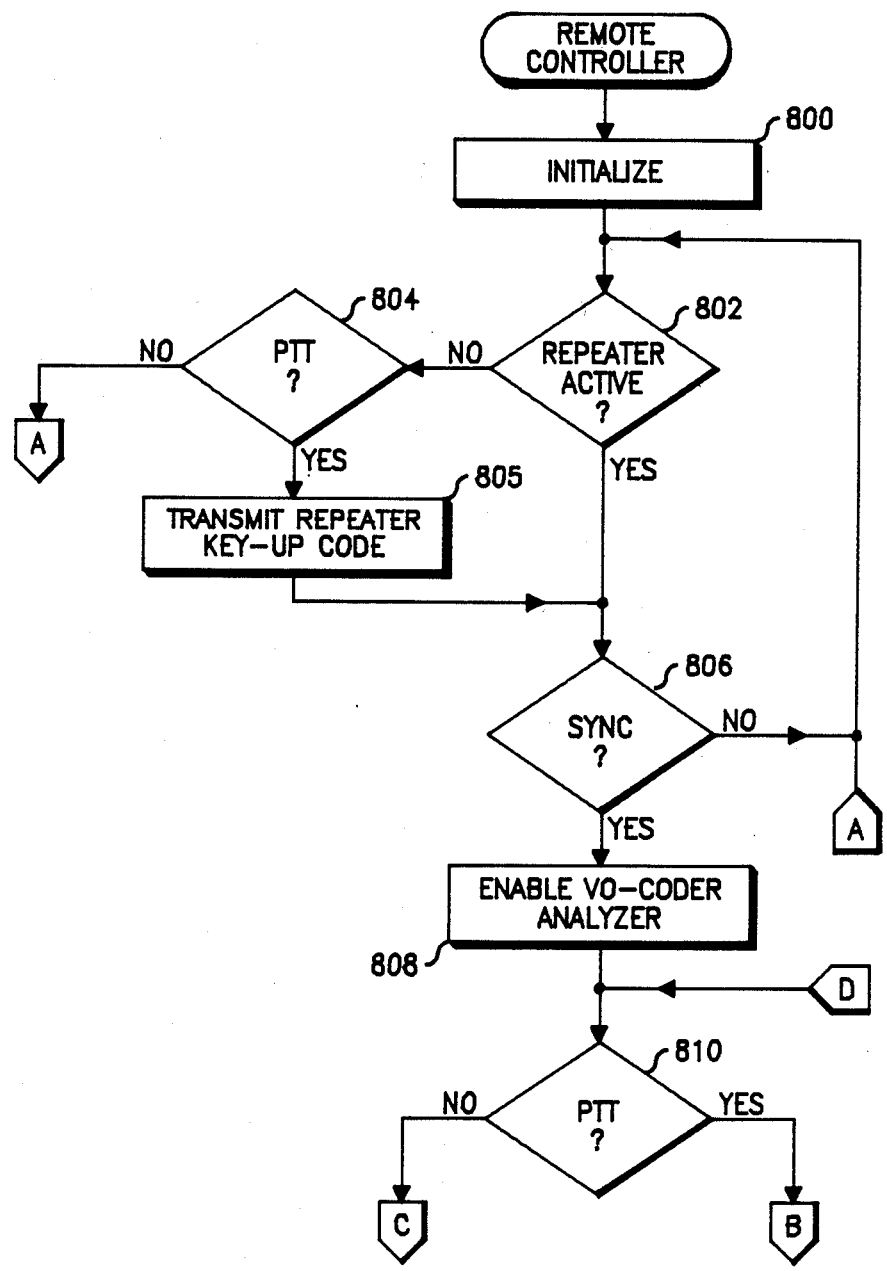
FIGS. 8a–8c are flow diagrams of the steps executed by the present invention to control the remote unit of FIG. 4.
Figure 8B:
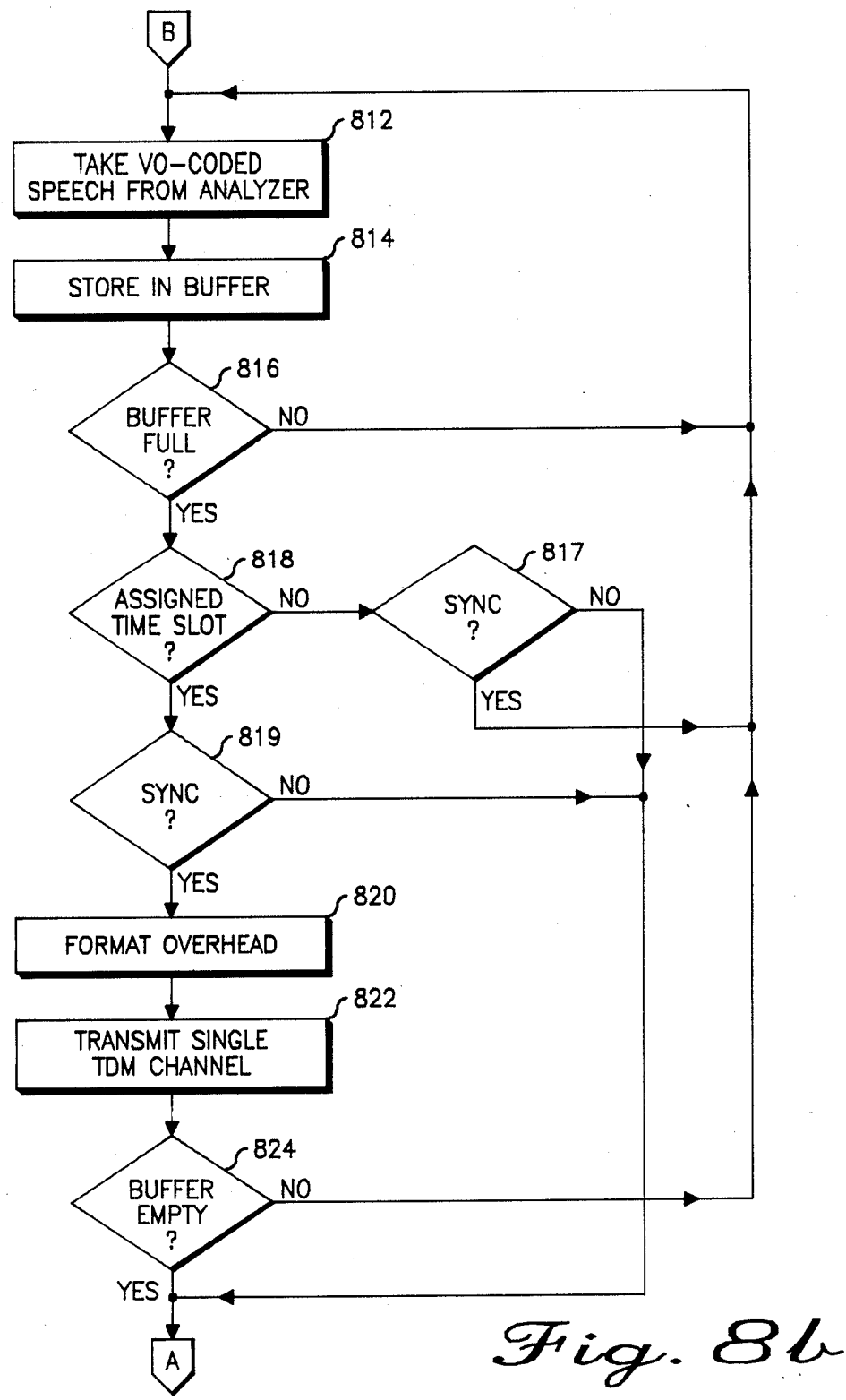
Figure 8C:
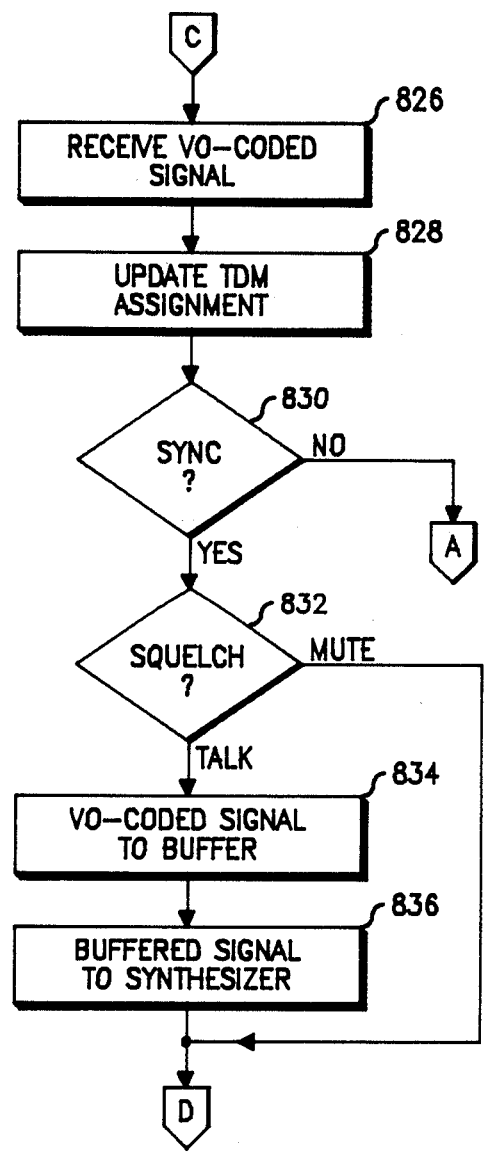

Referring now to FIGS. 8a–8c, there is shown a flow diagram of the steps executed by the present invention when utilized to control a remote unit. In FIG. 8a, the routine begins with the initialization step 800, which is executed during first time operation or after a reset. The initialization step 800 programs any frequency synthesizers and loads various ID codes that may be employed during the operation of the controller. The routine next proceeds to decision 802, which checks to see if the repeater is active. The remote unit determines if the repeater is active via the bit sync circuity that operates on the bit sync portion of the data overhead (see FIG. 3). A positive bit sync indication occurs if the repeater is operating (i.e., transmitting). Of course, if the repeater were inactive, the remote unit would not be able to obtain bit sync.

Referring again to FIG. 8a, if the repeater is not active the routine proceeds to decision 804 to detect whether the push-to-talk (PTT) switch has been actuated to initiate a communication. If the determination of decision 804 is that the PTT switch is not actuated, the routine returns to reference letter A and decision 802. The routine will continue in this loop until the PTT switch is actuated at which time the routine proceeds to step 805. In step 805, the predetermined repeater key-up code is transmitted to activate the repeater. The key-up code may be any suitable code and, of course, if in a particular implementation the repeater is always activated, step 805 could be omitted. Preferably, the repeaters are inactive (i.e., off the air) if no remote unit is transmitting. This conserves energy and increases the mean time between failure (MTBF) of the primary station. Of course, the repeaters could be designed to operate continuously thereby eliminating the need of an activation code. After transmitting the repeater key-up code, the routine proceeds to decision 806. Decision 806 determines whether or not synchronization has been achieved. Both bit synchronization and frame synchronization are required for an affirmative determination in decision 806 (however, bit sync may have already been established in decision 802). Frame sync is determined by a majority determination based on a three-of-five correct receptions of the frame sync word (see FIG. 3). If synchronization is established, the routine proceeds to step 808, which enables the analyzer of the particular vo-coder employed. Following the enabling of the vo-coding analyzer, the routine proceeds to decision 810, which determines whether the PTT switch has been activated. If the switch has been activated, the routine routes to reference letter B of FIG. 8b (to transmit). If the PTT switch is not activated, the routine proceeds to reference letter C of FIG. 8c (to receive).

Referring now to FIG. 8b, the steps involved during the transmit mode of the controller are shown. The routine begins in step 812, which takes the digitized speech information from the vo-coding analyzer. The vo-coded speech is stored in the buffer (408 of FIG. 4) in step 814 at the vo-coding data rate. Decision 816 determines whether the buffer is sufficiently full to begin transmitting. In the preferred embodiment, the buffer is deemed to be full (ready) when at least one-half of one slot of vo-coded data has been buffered. If decision 816 determines that the buffer is not sufficiently full, the routine returns to the reference letter B to receive more vo-coded speech from the analyzer in step 812. If the determination of decision 816 is that the buffer is sufficiently full, the routine proceeds to decision 818 to determine whether the present time slot is the assigned slot of a particular unit. The time slots must be assigned so that the mobile controller knows how many of the sub-slots (1-8) to combine for this particular communication slot. If the present time slot is not the unit's assigned time slot, the routine proceeds to decision 817 to check for sync. If decision 817 determines that sync has been lost, the routine proceeds to reference letter A. Otherwise, the routine proceeds to reference letter B. If decision 818 determines that the present time slot is the unit's assigned time slot, the routine proceeds to step 819 to determine whether the unit is still in frame sync. The unit will have a valid frame sync if it has correctly received five of the past nine frame sync words. If decision 819 determines that the unit has dropped frame sync, control returns to reference letter A. If the unit has held sync, the routine proceeds to step 820, which formats the data overhead preamble as previously described in conjunction with FIG. 3b. Following the data overhead formatting of step 820, step 822 transmits a single burst on the TDM channel by transmitting the overhead and vo-coded speech taken from the buffer at the transmission data rate. After this single slot is burst on to the TDM channel, decision 824 determines whether the buffer is empty. If the buffer is not empty, the routine returns to reference letter B which takes more speech and continues to transmit. If the buffer is empty, the routine returns to reference letter A of FIG. 8a which determines whether the repeater is active.

In FIG. 8c, the steps executed by the present invention for remote receive operations are shown. The routine begins in step 826 which receives the vo-coded signal from one or more time slots in the TDM channel. Step 828 updates the slot assignments for the device employing the controller. In the preferred embodiment, this represents updating a memory location which contains the number of sub-slots (1-8) that may be combined in various arrangements to form communication slots for the TDM device. The routine next proceeds to decision 830 to determine whether or not synchronization has been maintained. An affirmative determination results if the unit has correctly received five of the past nine frame sync words. If there is synchronization, the routine proceeds to decision 832 to determine whether the communication device is muted or whether the squelch is open to allow reception of the message. Those skilled in the art will appreciate various methods of squelch are known. One technique would consist of detecting whether the received signal is valid data or noise. An alternative would be to use a form of continuous squelch, commonly referred to as "digital private line" (DPL). Another alternative would be to employ begin-of-message (BOM) and end-of-message (EOM) data words pre-ambled and post-ambled to the message, respectively. Basically, any suitable squelch system is acceptable to the present invention to operate as decision 832. If the squelch is muted, the routine returns to reference letter D of FIG. 8a. However, if the squelch is unmuted the routine proceeds to step 834 where the vo-coded signal is placed in the buffer (426 of FIG. 4) at the received data rate. Step 836 removes the buffered signal from the buffer at the vo-coding data rate and presents it to the vo-coding synthesizer (432 in FIG. 4). The vo-coding synthesizer reconstructs the original voice message and presents it to the operator either via a speaker or other means. Following the completion of the synthesized message, the routine returns to reference letter D of FIG. 8a.

Figure 9:
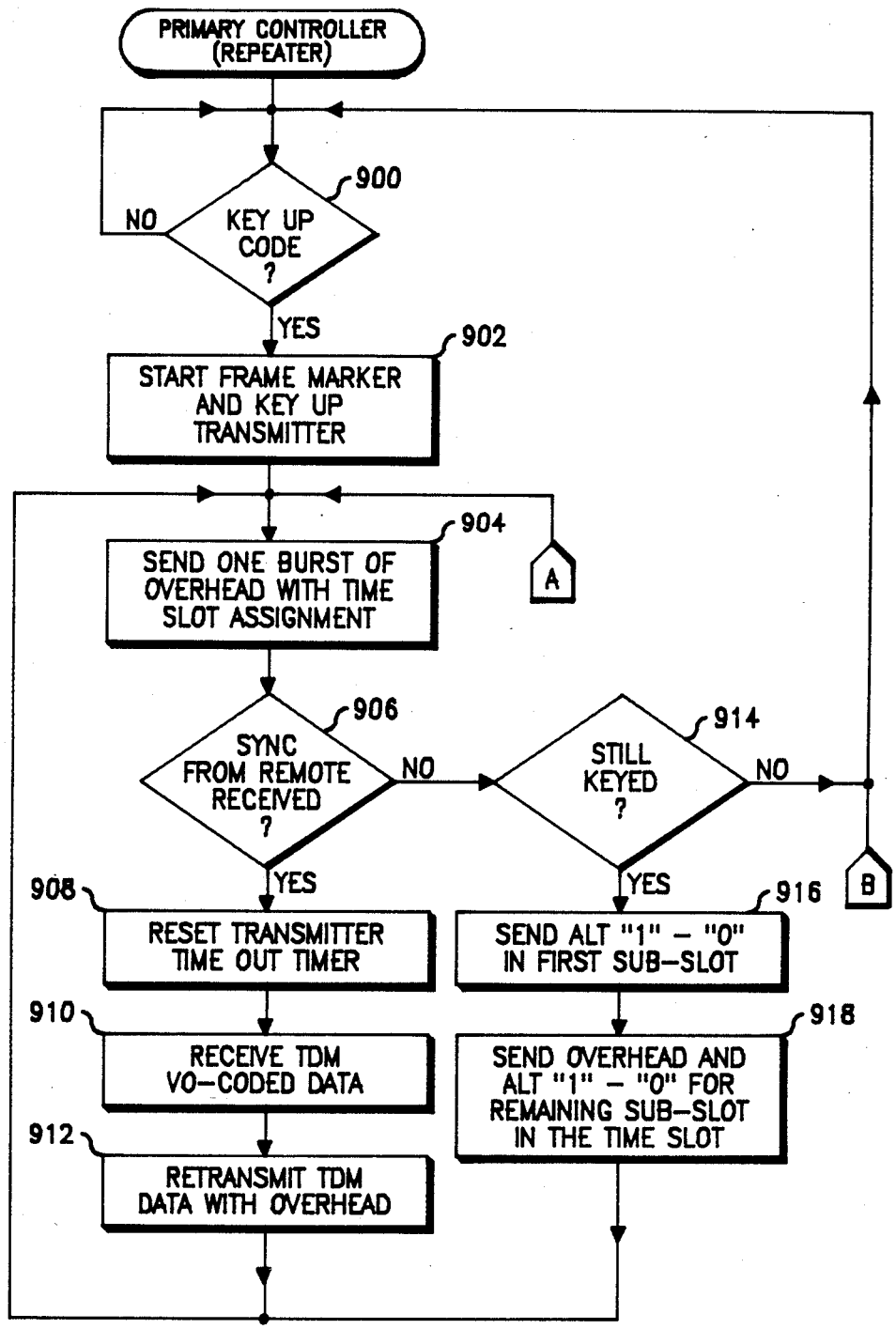
FIG. 9 is a flow diagram of the steps executed by the present invention to control the primary stations of FIGS. 6 or 7.

Referring now to FIG. 9, the steps executed by the present invention when used to control a primary station (repeater) are illustrated. The routine begins in decision 900, which determines whether the key up code has been received from a particular remote unit. If the key up code is not received, the repeater waits (i.e., off the air) until a key up code is received. Assuming, however, that the key up code was received, the routine proceeds to step 902, which starts the frame marker and keys up the transmitter. Step 904 transmits one burst of the data overhead defined in FIG. 3a containing the TDM slot assignment for the remote unit. After the remote unit receives sync and a slot assignment, the remote unit transmits the data overhead and TDM vo-coded data message to the repeater. Accordingly, decision 906 determines whether the synchronization (both bit and frame) from the mobile has been received in the present time slot. If sync has been received, the routine proceeds to step 908, which resets a transmitter time-out-timer, which may be present to prevent the transmitter from transmitting either permanently or for prolonged periods. The routine then proceeds to step 910, which receives the TDM vo-coded data from the particular slot (or group of slots) assigned by the repeater. Step 912 retransmits or repeats the TDM data in another time slot on either the same frequency or in the same or different time slot on a second frequency depending upon which type of repeater is employed. Following the retransmission of step 912, the routine returns to reference letter A, which again sends one burst of data overhead with the time slot assignment and continues in this loop until there is no more vo-coded data to transmit.

Referring again to decision 906, if the decision of step 906 is that the synchronization was not received in the present time slot, the routine proceeds to decision 914, which determines whether or not the repeater transmitter is still keyed. The repeater transmitter may not be keyed if the time-out-timer has expired or a dekey code has been received (if any such code is employed). If the determination of decision 914 is that the repeater is still keyed, an alternating logical one and logical zero pattern are transmitted in the first sub-slot in step 916. Following step 916 the data over-head and slot assignment are transmitted in each of the sub-slots that form the particular time slot used. Since the data over-head will not fill a sub-slot, an alternating logical one and logical zero pattern is used to fill each sub-slot. Following step 918 the routine returns to reference letter A, which will again send one burst of data overhead with the time slot assignment to the mobile unit, and then to decision 906 to recheck if the repeater has properly received synchronization from the remote unit. If the determination of decision 914 is that the repeater is no longer keyed, the routine returns to reference letter B, which again will await the key up code before the repeater is operational again.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. A method for controlling a remote communication device to transmit voice or data signals preambled by a data signal in a time division multiplex communication system having at least one primary station and a plurality of remote units, comprising the steps of:
   (a) transmitting an activation code to the primary station if the primary station is determined to be inactive;
   (b) synchronizing to a signal received from the primary station;
   (c) enabling a vo-coding analyzer to vo-code a voice signal at a selected coding rate, V, to provide an information signal;
   (d) buffering said information signal to provide a buffered signal;
   (e) transmitting said buffered signal preambled by a data signal over a communication channel having a predetermined maximum data rate, C, in accordance with a time division multiplex protocol defining N time slots, where N is a positive integer less than or equal to C/V, where V comprises said selected coding rate, said buffered signal preambled by said data signal being transmitted in at least one of said N time slots at a rate exceeding 2 V.

2. The method of claim 1, wherein the step of synchronizing comprises the steps of:
   (a) adjusting a bit synchronization means in response to a bit sync signal;
   (b) detecting a predetermined frame synchronization word.

3. The method of claim 2, wherein said detecting step comprises detecting said predetermined frame synchronization word based on a three of five majority decision.

4. The method of claim 1, wherein said enabling step enables a data source to provide said information signal.

5. A method for controlling a remote communication device to receive an information signal including at least data or vo-coded voice signals preambled by a data signal, said remote unit operating in a time division multiplex communication system having at least one primary station and a plurality of remote units, said method comprising the steps of:
   (a) synchronizing to a signal received from the primary station;
   (b) receiving the information signal during at least one time slot from a communication channel having a predetermined maximum data rate, C, in accordance with a time division multiplex protocol defining N time slots, where N is a positive integer less than or equal to C/V, where V comprises a selected coding rate, said information signal being received at a rate exceeding 2 V to provide a received information signal;
   (c) buffering said received information signal to provide a buffered signal;
   (d) synthesizing a recovered voice signal from said buffered signal at said selected coding rate.

6. The method of claim 5, which includes the step of unmuting the remote device in response to receiving the information signal.

7. The method of claim 5, wherein the step of synchronizing comprises the steps of:
   (a) adjusting a bit synchronization means in response to a bit sync signal;
   (b) detecting a predetermined frame synchronization word.

8. The method of claim 7, wherein said detecting step comprises detecting said predetermined frame synchronization word based on a three of five majority decision.

9. The method of claim 5, which includes the step of updating a memory location to contain time slot assignment information received from the primary station.

10. The method of claim 5, wherein said synthesizing step includes the step of enabling a vo-coding synthesizer.

11. A method for controlling a primary station to operate in a time division multiplex communication system having a plurality of remote units, comprising the steps of:
   (a) receiving an activation code from at least one of the plurality of remote units;
   (b) transmitting a data signal containing at least a synchronization portion and slot assignment information to at least one remote station;
   (c) receiving an information signal from a remote unit, including a preambled data signal, during at least one time slot from a communication channel having a predetermined maximum data rate, C, in accordance with a time division multiplex protocol defining N time slots, where N is a positive integer less than or equal to C/V, where V comprises a selected coding rate, said information signal being received at a rate exceeding 2 V to provide a received information signal;
   (d) repeating said received information signal preambled by a data signal in at least one of said N time slots at said rate exceeding 2 V;
   (e) operating, thereafter, continuously until it is determined that none of the plurality of remote units have transmitted information for a time interval, after which, the primary station automatically deactivates.

12. The method of claim 11, which includes the step of re-transmitting said data signal of step (b) upon the failure of receiving the preambled data signal of step (c).

13. The method of claim 11, which includes the step of buffering said received information signal of step (c) prior to repeating same in step (d).

14. A method for communicating information between a first time division multiplex communication device and a plurality of remote time division multiplex communication devices via a time division multiplex repeater, comprising the steps of:
   (a) at a first communication device:
     (1) transmitting an activation code to the repeater if the repeater is determined to be inactive;
     (2) transmitting an information signal to the repeater in a first time slot over a communication channel having a predetermined maximum data rate, C, in accordance with a time division multiplex protocol defining N time slots, where N is a positive integer less than or equal to C/V, where V comprises a selected coding rate, said information signal being transmitted at a rate exceeding 2 V;
   (b) at the repeater:
     (1) receiving said activation code;
     (2) transmitting a synchronization signal to the plurality of remote communication devices;
     (3) receiving said information signal from said communication channel during said first time slot;
     (4) repeating said information signal in a second time slot preambled by a data signal;

(5) operating, thereafter, continuously until it is determined that none of the plurality of remote units have transmitted information for a time interval, after which, the repeater automatically deactivates.

(c) at the remaining plurality of remote communication devices or a portion thereof:
  (1) synchronizing to said synchronization signal;
  (2) receiving said repeated information signal in an assigned time slot.

15. The method of claim 14, wherein the step of synchronizing at said remote communication devices comprises the steps of:
  (a) adjusting a bit synchronization means in response to a bit sync signal;
  (b) detecting a predetermined frame synchronization word.

* * * * *